(12) United States Patent
Laughery et al.

(10) Patent No.: US 11,043,146 B2
(45) Date of Patent: Jun. 22, 2021

(54) FAN BLADE REFURBISHMENT TRAINING DEVICE

(71) Applicant: United Technologies Corporation, Farmington, CT (US)

(72) Inventors: Delbert Laughery, Columbia, CT (US); Dennis J. Ryckman, Tawas City, MI (US)

(73) Assignee: Raytheon Technologies Corporation, Farmington, CT (US)

( * ) Notice: Subject to any disclaimer, the term of this patent is extended or adjusted under 35 U.S.C. 154(b) by 379 days.

(21) Appl. No.: 16/105,458

(22) Filed: Aug. 20, 2018

(65) Prior Publication Data
US 2020/0058236 A1 Feb. 20, 2020

(51) Int. Cl.
| | | |
|---|---|---|
| G09B 25/02 | (2006.01) | |
| F01D 5/00 | (2006.01) | |
| F01D 21/00 | (2006.01) | |
| F04D 19/00 | (2006.01) | |
| F04D 29/38 | (2006.01) | |
| F04D 29/52 | (2006.01) | |
| F04D 29/64 | (2006.01) | |
| G09B 19/00 | (2006.01) | |

(52) U.S. Cl.
CPC ............ *G09B 25/025* (2013.01); *F01D 5/005* (2013.01); *F01D 21/006* (2013.01); *F04D 19/007* (2013.01); *F04D 29/388* (2013.01); *F04D 29/522* (2013.01); *F04D 29/646* (2013.01); *G09B 19/00* (2013.01); *F04D 19/002* (2013.01); *F05D 2220/36* (2013.01); *F05D 2230/80* (2013.01); *F05D 2240/303* (2013.01); *F05D 2260/90* (2013.01)

(58) Field of Classification Search
CPC ............................. G09B 25/02; G09B 25/025
See application file for complete search history.

(56) References Cited

U.S. PATENT DOCUMENTS

| | | | | |
|---|---|---|---|---|
| 3,031,776 A | * | 5/1962 | Randall | G09B 9/18 434/389 |
| 4,073,069 A | * | 2/1978 | Basmajian | G09B 25/02 290/52 |
| 4,738,594 A | | 4/1988 | Sato | |
| 5,165,859 A | | 11/1992 | Monroe | |
| 5,197,191 A | * | 3/1993 | Dunkman | B23P 6/002 29/402.19 |
| 5,281,062 A | | 1/1994 | Dunkman et al. | |

(Continued)

FOREIGN PATENT DOCUMENTS

EP 0514604 A2 * 11/1992 ............. F01D 5/005

OTHER PUBLICATIONS

EP search report for EP19192693.0 dated Dec. 18, 2019.
Singapore search report for 10201907658Y dated May 26, 2020.

*Primary Examiner* — Kurt Fernstrom
(74) *Attorney, Agent, or Firm* — Getz Balich LLC (57) ABSTRACT

A training apparatus is provided that includes a stand and at least one gas turbine engine fan stage. The at least one gas turbine engine fan stage has a plurality of fan rotor blades attached to a disk. The at least one gas turbine engine fan stage has an axially extending centerline, and the disk is mounted for rotation about the axially extending centerline. The stand is configured to support the at least one gas turbine engine fan stage.

18 Claims, 5 Drawing Sheets

(56) References Cited

U.S. PATENT DOCUMENTS

| | | | | |
|---|---|---|---|---|
| 5,363,738 | A * | 11/1994 | Kotch | G09B 9/00 91/1 |
| 5,644,394 | A | 7/1997 | Owens | |
| 6,082,349 | A * | 7/2000 | Cheng | F41A 21/32 124/56 |
| 6,302,625 | B1 | 10/2001 | Carey et al. | |
| 7,103,309 | B1 * | 9/2006 | Motosko | G09B 5/04 434/308 |
| 7,333,913 | B2 * | 2/2008 | Andarawis | G01B 7/144 702/158 |
| 7,780,419 | B1 | 8/2010 | Matheny et al. | |
| 7,841,834 | B1 | 11/2010 | Ryznic | |
| 7,942,632 | B2 | 5/2011 | Lord et al. | |
| 8,794,969 | B2 | 8/2014 | Tenning et al. | |
| 8,876,448 | B1 | 11/2014 | Hess et al. | |
| 2008/0281562 | A1 * | 11/2008 | Chou | G01M 9/065 703/1 |
| 2009/0294625 | A1 | 12/2009 | Fernley | |
| 2011/0231171 | A1 * | 9/2011 | Jousselin | G06F 30/20 703/7 |
| 2012/0082967 | A1 * | 4/2012 | Stone | G09B 19/003 434/219 |
| 2013/0066615 | A1 * | 3/2013 | Morgan | G06F 30/20 703/7 |
| 2013/0171611 | A1 * | 7/2013 | Hynous | G09B 25/02 434/389 |
| 2014/0030106 | A1 | 1/2014 | Schreiber | |

* cited by examiner

FAN BLADE REFURBISHMENT TRAINING DEVICE

BACKGROUND OF THE INVENTION

1. Technical Field

This disclosure relates generally to gas turbine engine fan blade repairs, and to fan blade repair training devices in particular.

2. Background Information

Gas turbine engines, particularly those in aircraft applications, will occasionally ingest substances (e.g., water and sand) entrained within air drawn into the engine that can erode portions of the fan blade, particularly the leading edge of the airfoil. Fan blades are particularly susceptible to foreign object damage ("FOD") wherein a foreign object (e.g., birds, ground debris, etc.) will impact an airfoil and cause deformation. Left unchecked, deformation and erosion can negatively affect the performance of the airfoil. As part of routine maintenance, fan blades are periodically inspected. In those instances where the wear or damage exceeds specifications, the rotor blade or stator vane must be refurbished or replaced. A person of skill in the art will recognize that airfoils within a gas turbine engine, particularly fan blades, can be very expensive to replace. Hence, there is considerable advantage in refurbishing a fan blade whenever possible.

Fan blade refurbishment methods that require disassembly of a fan blade stage from an engine greatly increase the cost of the refurbishment and the time required to perform the refurbishment. Hence, techniques that permit the appropriate refurbishment to be performed without disassembly (i.e., refurbishment is performed "in-situ") are desirable. However, in-situ refurbishment techniques must be performable on an assembled engine. For example, in some instances a fan stage having a fan blade airfoil requiring refurbishment may be directly aft of an inlet guide vane stage. In this type of situation, access to the fan blade airfoil may be limited not only by the other fan rotor blades within the stage, but also by the inlet guide vane assembly or other components (e.g., a casing, etc.). Hence, the refurbishment techniques must account for the permissible access.

A person of skill in the art will recognize that the accuracy of a refurbishment is important because the geometric configuration of the airfoil (e.g., the leading edge) is critical to the aerodynamic performance of the airfoil, and consequent performance of the engine. A person of skill will further recognize that refurbishments, which often include manual processes, almost always require the service of a highly-skilled and trained technician. Moreover, the applicability of a refurbishment technique may vary between a first configuration gas turbine engine and a second configuration gas turbine engine. For in-situ refurbishments, therefore, there is a clear need for equipment and training that allows a technician to develop the skills and experience to successfully perform refurbishment techniques in-situ on particular gas turbine engine configurations. A person of skill in the art will also recognize that an improper in-situ repair of a fan rotor blade can necessitate removal of the fan rotor blade, and possibly the costly and time extensive removal of the entire fan stage and/or engine. Hence, there is a need for a training apparatus that permits a service technician to apply, learn, and practice inspection and/or repair techniques to decrease the cost and time required to service a gas turbine engine.

SUMMARY

According to an aspect of the present disclosure, a training apparatus is provided that includes a stand and at least one gas turbine engine fan stage. The at least one gas turbine engine fan stage has a plurality of fan rotor blades attached to a disk. The at least one gas turbine engine fan stage has an axially extending centerline, and the disk is mounted for rotation about the axially extending centerline. The stand is configured to support the at least one gas turbine engine fan stage.

In any of the aspects or embodiments described above and herein, the training apparatus may include an inlet section in communication with the at least one gas turbine engine fan stage, disposed forward of the at least one gas turbine engine fan stage.

In any of the aspects or embodiments described above and herein, the training apparatus may include a casing that at least partially encloses the at least one gas turbine engine fan stage. In some embodiments, the casing may include at least one access port. In some embodiments, the casing may be configured as a split casing having a first portion and a second portion.

In any of the aspects or embodiments described above and herein, the training apparatus may include a fan stage rotational resistance device, which device is configured to adjustably resist rotation of the at least one gas turbine engine fan stage.

In any of the aspects or embodiments described above and herein, the plurality of fan rotor blades may include at least one learning fan rotor blade having an airfoil, the airfoil having a geometric configuration with at least one preexisting geometric deviation, and the at least one preexisting geometric deviation being deviant from a design geometric configuration of a reference fan rotor blade.

In any of the aspects or embodiments described above and herein, the at least one preexisting geometric deviation may be disposed proximate a leading edge of the airfoil.

In any of the aspects or embodiments described above and herein, the at least one learning fan rotor blade may comprises a first material, and a remainder of the plurality of fan rotor blades may comprise a second material, wherein the second material is different from the first material.

In any of the aspects or embodiments described above and herein, the plurality of fan rotor blades may include at least one learning fan rotor blade having an airfoil and at least one selectively replaceable section, the at least one selectively replaceable section having at least one preexisting geometric deviation, and the at least one preexisting geometric deviation being deviant from a design geometric configuration of a reference fan rotor blade.

In any of the aspects or embodiments described above and herein, the at least one learning fan rotor blade airfoil may be configured to receive the at least one selectively replaceable section, and the at least one selectively replaceable section may be configured such that when the at least one selectively replaceable section is received on the airfoil, the airfoil substantially conforms to a design configuration of the reference fan rotor blade.

In any of the aspects or embodiments described above and herein, the at least one selectively replaceable section may be configured to form at least a portion of a leading edge of the at least one learning fan rotor blade airfoil.

In any of the aspects or embodiments described above and herein, the at least one selectively replaceable section may be attached to the airfoil by fasteners.

In any of the aspects or embodiments described above and herein, the at least one learning fan rotor blade may comprise a first material, and a remainder of the plurality of fan rotor blades may comprise a second material, wherein the second material is different from the first material.

In any of the aspects or embodiments described above and herein, the at least one learning fan rotor blade comprises a first material, and the at least one selectively replaceable section comprises a second material, wherein the second material is different from the first material.

According to an aspect of the present disclosure, a training apparatus is provided that includes a first gas turbine engine fan stage, a second gas turbine engine fan stage, and a stand. The first gas turbine engine fan stage has a plurality of first fan rotor blades attached to a first disk. The first gas turbine engine fan stage has a first axially extending centerline, and the first disk is mounted for rotation about the first axially extending centerline. The second gas turbine engine fan stage has a plurality of second fan rotor blades attached to a second disk. The second gas turbine engine fan stage has a second axially extending centerline, and the second disk is mounted for rotation about the second axially extending centerline. The first gas turbine engine fan stage is independent of the second gas turbine engine fan stage. The stand is configured to support the first gas turbine engine fan stage and the second gas turbine engine fan stage.

In any of the aspects or embodiments described above and herein, the first gas turbine engine fan stage and the second gas turbine engine fan stage may be oppositely positioned, and the training apparatus may include a casing that at least partially encloses the first gas turbine engine fan stage and the second gas turbine engine fan stage.

In any of the aspects or embodiments described above and herein, at least one of the plurality of first fan rotor blades or the plurality of second fan rotor blades may include at least one learning fan rotor blade having an airfoil, the airfoil having a geometric configuration with at least one preexisting geometric deviation, the at least one preexisting geometric deviation being deviant from a design geometric configuration of a reference fan rotor blade.

In any of the aspects or embodiments described above and herein, at least one of the plurality of first fan rotor blades or the plurality of second fan rotor blades may include at least one learning fan rotor blade having an airfoil and at least one selectively replaceable section, the at least one selectively replaceable section having at least one preexisting geometric deviation, the at least one preexisting geometric deviation being deviant from a design geometric configuration of a reference fan rotor blade.

In any of the aspects or embodiments described above and herein, the first gas turbine engine fan stage and the second gas turbine engine fan stage may be rotationally independent of one another.

The present disclosure, and all its aspects, embodiments and advantages associated therewith will become more readily apparent in view of the detailed description provided below, including the accompanying drawings.

DETAILED DESCRIPTION

It is noted that various connections are set forth between elements in the following description and in the drawings. It is noted that these connections are general and, unless specified otherwise, may be direct or indirect and that this specification is not intended to be limiting in this respect. A coupling between two or more entities may refer to a direct connection or an indirect connection. An indirect connection may incorporate one or more intervening entities.

Figure 1:
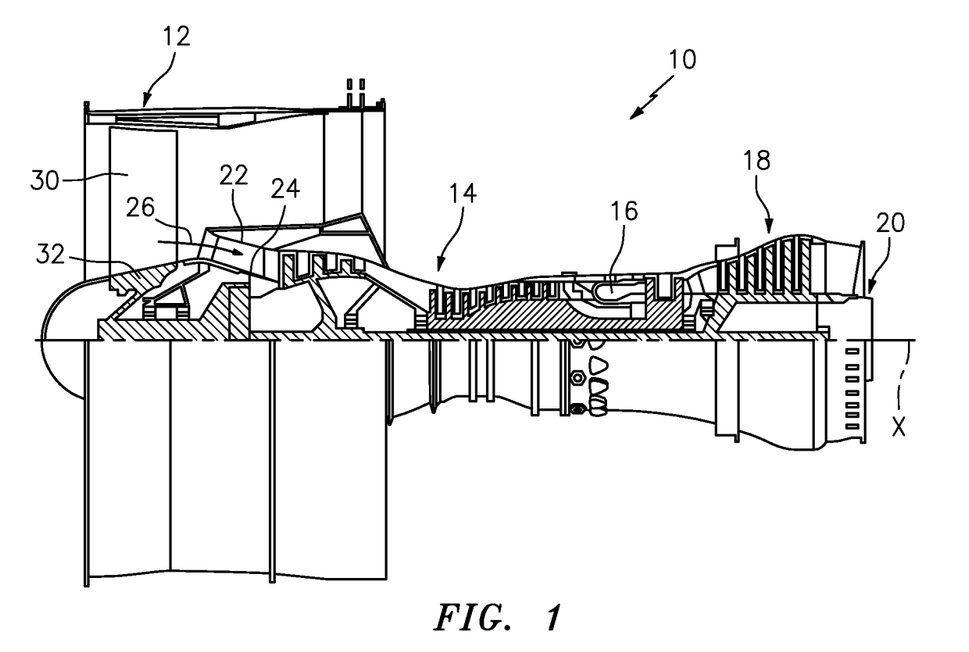
FIG. 1 is a sectioned view an exemplary gas turbine engine embodiment having a fan stage for use with the present invention.

FIG. 1 diagrammatically illustrates a gas turbine engine 10 which generally includes a fan section 12, a compressor section 14, a combustor section 16, a turbine section 18, and a nozzle section 20 disposed along an axially extending axis "X". The present disclosure is applicable to a variety of different gas turbine engine types and/or configurations, however, and is not limited to any particular type or configuration gas turbine engine. The exemplary gas turbine engine 10 shown in FIG. 1 includes an outer engine structure 22 and an inner engine structure 24 that collectively at least partially define a core gas flow path 26. The "forward" end of the engine 10 is the air inlet end of the engine 10, and the "aft" end of the engine 10 is the air exhaust end of the engine 10; e.g., the fan section 12 is disposed at the forward end of the engine 10, and the nozzle section 20 is disposed at the aft end of the engine 10. Unless otherwise specified, a "forward" portion of a component within the engine 10 is subjected to gas traveling through the engine gas flow path prior to an "aft" portion of the aforesaid component.

The fan section 12 includes a one or more fan stages, and each fan stage includes a plurality of fan rotor blades 30 circumferentially disposed around a disk 32. In some embodiments, the fan rotor blades 30 may be attached to a disk 32 by mechanical attachment; e.g., each fan rotor blade 30 includes a root 34 (e.g., see FIG. 2) engaged within a slot (not shown) disposed within the disk 32. In some embodiments, the fan rotor blades 30 and the disk 32 may be a unitary structure (sometimes referred to as an "integrally bladed rotor" or "IBR"). The present disclosure is not limited to any particular fan rotor blade 30 and disk 32 configuration.

Some engine embodiments include a variable shape inlet guide vane (IGV) system (not shown) disposed forward of a first fan stage. An IGV system may include a plurality of circumferentially mounted vanes.

Figure 2:
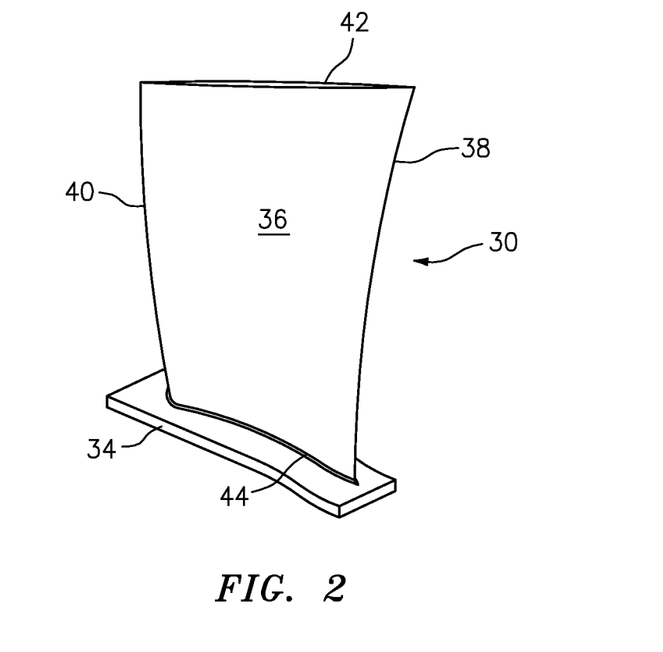
FIG. 2 is a perspective view of a fan rotor blade embodiment.

Referring to FIG. 2, each fan rotor blade 30 includes an airfoil 36 that extends generally axially between a forward leading edge 38 and an aft trailing edge 40, and radially between a radially outer tip end 42 and a radially inward root end 44. The present disclosure is not limited to any particular fan rotor blade geometric configuration.

Referring to FIGS. 3-6, aspects of the present disclosure include a training apparatus 46 that includes at least one fan stage 48 rotatable about a center axis 50, an inlet section 52, and a stand 54. Some training apparatus 46 embodiments also include a casing 56. The training apparatus 46 embodiments shown in FIGS. 3-6 include two independent fan stages 48A, 48B disposed opposite one another, each providing an independent training station. Alternative embodiments of the present disclosure training apparatus 46 may include a single fan stage 48 or more than two fan stages 48; e.g., more than two independent fan stages 48.

To simplify the description, the at least one fan stage 48 will be described hereinafter in terms of a single fan stage 48 unless otherwise stated but is not limited thereto. As stated above, the fan stage 48 includes a plurality of fan rotor blades 130 attached to and positioned around the circumference of a disk 132 (e.g., see FIG. 4). The fan stage 48 is typically mounted on a rotatable shaft 58 (See FIG. 5, showing shaft 58A for fan stage 48A and shaft 58B for fan stage 48B) that may be supported by one or more bearing assemblies 60 to facilitate rotation of the fan stage 48. In some embodiments, the training apparatus 46 may include a nose cone 62. As will be described below, the training apparatus 46 is typically configured to substantially replicate a particular gas turbine engine model for purposes of producing a training apparatus 46 for that particular gas turbine engine model. Hence, a present disclosure training apparatus 46 configured as a training tool for an XX model gas turbine engine (where "XX" is used as a generic descriptor) will have a fan stage 48 that closely replicates a fan stage present within the XX model gas turbine engine; e.g., the fan stage 48 will include a disk 132 that substantially replicates the disk used in the XX model gas turbine engine, will include the same number of fan rotor blades 130 that are present within the applicable fan stage of the XX model gas turbine engine, with each fan rotor blade 130 being a substantial replica of the fan rotor blades present within the fan stage (except as described hereinafter) of the particular model gas turbine engine, etc. In some embodiments, the inlet section 52 of the training apparatus 46 will be a substantial replica of the inlet section of the XX model gas turbine engine. If the XX model gas turbine engine includes an inlet guide vane stage disposed forward of the fan stage, the training apparatus 46 may include a replica of the inlet guide vane stage found within the XX model gas turbine engine. Some embodiments of the present disclosure training apparatus 46 may include a casing 56 that is at least in part a replica of a casing used with the XX model gas turbine engine. In short, other than as described herein, embodiments of the present disclosure training apparatus 46 are configured to be a substantial replica of a portion of a particular gas turbine engine to provide a training device that realistically depicts the particular gas turbine engine. A service technician training on the training apparatus 46, will therefore subsequent to training, be well versed to provide in-situ service on an actual fan stage within that particular gas turbine engine model.

As stated above, some embodiments of the training apparatus 46 may include more than one fan stage 48. In the embodiments shown in FIGS. 3-6, each fan stage 48A, 48B is substantially identical; e.g., they are both configured to be replicas of a particular fan stage present within the XX model gas turbine engine. In alternative embodiments, a first of the fan stages 48A may be configured to be a replica of a fan stage present within the XX model gas turbine engine, and the second of the fan stages 48B may be configured to be a replica of a different fan stage; e.g., a fan stage present within a variant of the XX model gas turbine engine (e.g., an earlier or later version of the same model gas turbine engine, etc.), or a fan stage present within a completely different model gas turbine engine (e.g., a "YY" model gas turbine engine), etc. In short, in those embodiments of the present training device that include two or more fan stages 48, the fan stages 48 need not be substantial replicas of the same fan stage. Each fan stage 48 (identical or different) is independent of the other; e.g., each fan stage is freely rotatable, and is not mechanically engaged with the other.

A person of skill in the art will recognize that an actual fan rotor blade for an operating gas turbine engine 10 will be originally manufactured to a geometric configuration within initial design dimensions and/or manufacturing tolerances. A person of skill in the art will further recognize that an actual fan rotor blade from an operating gas turbine engine after some amount of use may have one or more geometric deviations within a first defined tolerance range (i.e., normal wear) that need not be repaired. A fan rotor blade having a geometric deviation(s) within a second defined tolerance range (i.e., a "repairable" range beyond normal wear) can often be repaired by various known techniques; e.g., grinding, blending, polishing, etc. A fan rotor blade having a geometric deviation beyond the repairable range may not be repairable and must be replaced.

Figure 7:
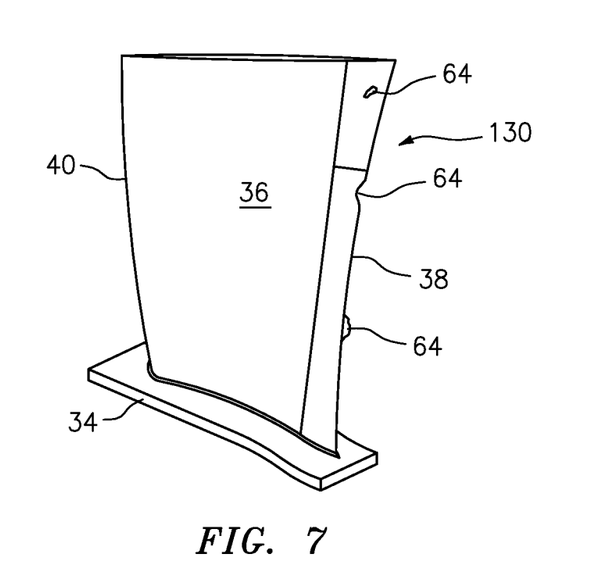
FIG. 7 is a perspective view of a fan rotor blade embodiment.

Referring to FIG. 7, at least one of the fan rotor blades 130 within the fan stage 48 (hereinafter referred to as a "learning fan rotor blade") may be initially configured with one or more geometric deviations 64 (e.g., a deformity) that alter the fan rotor blade 130 from its original design geometric configuration, including tolerances (collectively referred to herein as a "design geometric configuration"). As stated herein, the fan rotor blades 130 within the fan stage 48 are typically replicas of an actual fan rotor blade of a particular gas turbine engine. That "actual fan rotor blade" may be referred to herein as a "reference fan rotor blade". Hence, a learning fan rotor blade 130 may be initially configured with one or more geometric deviations 64 that are deviant (e.g., exceed, greater than, less than, etc.) from the design geometric configuration of the applicable reference fan rotor blade. The term "preexisting deformity 64" as used herein refers to a geometric aspect that is deviant from the design geometric configuration of the reference fan rotor blade. The present training apparatus 46 is configured to permit the practice of inspection techniques for, and as required repair techniques to, the fan rotor blades 130 within a fan stage 48 by a service technician; e.g., inspection and/or repair of the airfoil portion 36 of a learning fan rotor blade 130. Hence, embodiments of the present training apparatus 46 provide a platform on which one or more inspection techniques and/or repair techniques can be applied, learned, and practiced by a service technician. It is noted, however, that the present disclosure is not limited to any specific inspection or repair technique.

As stated above, a learning fan rotor blade 130 may be configured with one or more preexisting geometric deviations 64. In some instances, a learning fan rotor blade 130 may include one or more preexisting deviations 64 within a normal wear tolerance range, or within a repairable tolerance range, or beyond a repairable tolerance range, or any combination thereof (such ranges typically being applicable to the reference fan rotor blade). One or more preexisting deviations 64 within a normal wear tolerance range and/or beyond a repairable tolerance range may be included for purposes of training a technician in inspection techniques. One or more preexisting deviations 64 within a repairable tolerance range may be included not only for the purpose of training a technician in inspection techniques, but also for the purpose of training the technician in repair techniques.

Figure 8:
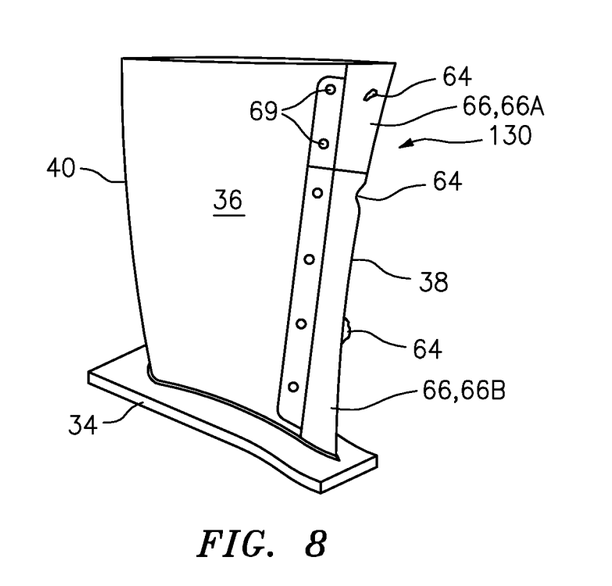
FIG. 8 is a perspective view of a fan rotor blade embodiment.
Figure 9:
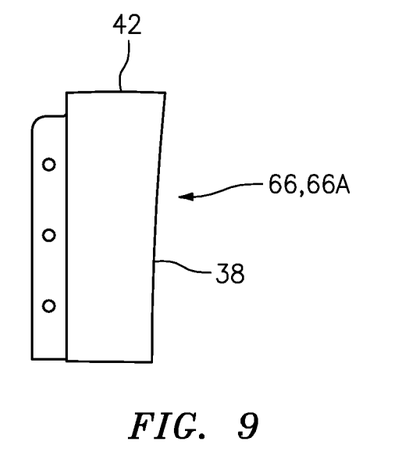
FIG. 9 is a planar view of a selectively replaceable section embodiment for a fan rotor blade.
Figure 10:
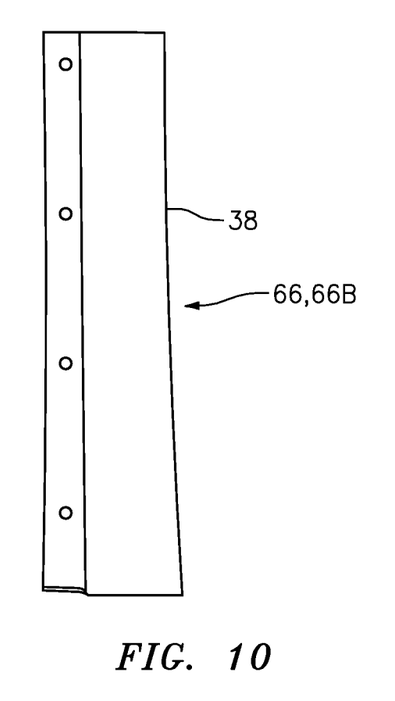
FIG. 10 is a planar view of a selectively replaceable section embodiment for a fan rotor blade.

Referring to FIGS. 8-10, in some embodiments a learning fan rotor blade 130 may include one or more selectively replaceable sections 66, each with one or more of the aforesaid preexisting deviations 64. The learning fan rotor blade 130 airfoil 36 is configured to receive the selectively replaceable section 66, and the selectively replaceable section 66 is configured such that when the selectively replaceable section 66 is received (e.g., mounted and attached) on the airfoil 36, the configuration of the airfoil 36 substantially conforms to the design configuration of the airfoil 36; e.g., substantially conforms to reference fan rotor blade. The selectively replaceable sections 66 are configured for training purposes and are not configured themselves to repair the airfoil 36; i.e., simply attaching a selectively replaceable section 66 will not repair the airfoil 36. Each selectively replaceable section 66 may be attached by any means that permits removal and replacement (e.g., by fasteners 69, etc.) and the present disclosure is not limited to any particular section attachment means. The one or more selectively replaceable sections 66 may facilitate use of the present disclosure training apparatus 46 by facilitating "set-up" of the apparatus 46; e.g., prior to the start of a training session, a selectively replaceable section 66 with a preexisting deviation 64 may be installed on a learning fan rotor blade 130 airfoil 36. One or more of the aforesaid inspection and repair techniques may then be utilized on that selectively replaceable section 66. Once the aforesaid techniques have been applied, then the selectively replaceable section 66 can be replaced with a new replaceable section 66 with a preexisting deviation 64 (e.g., a different preexisting deviation 64) to facilitate additional training. As will be disclosed below, in some embodiments the training apparatus 46 may be configured to permit the selectively replaceable section(s) 66 to be replaced without removal of the fan rotor blade 130 from the fan stage 48, thereby facilitating use of the training apparatus 46.

To illustrate a learning fan rotor blade that includes one or more selectively replaceable sections 66, it is noted that an actual fan rotor blade within an operating gas turbine engine often encounters damage at and/or proximate the leading edge 38 of its airfoil 36. To facilitate training, therefore, a learning fan rotor blade 130 may include one or more selectively replaceable airfoil leading edge sections 66, each with one or more of the aforesaid preexisting deviations 64. The present disclosure is not, however, limited to learning fan rotor blade 130 airfoils 36 that include a selectively replaceable section for a leading edge 38 of its airfoil 36; e.g., a selectively replaceable section 66 may be configured for elsewhere on the fan rotor blade 130 such as the trailing edge 40, etc.

The exemplary fan rotor blade 130 embodiment shown in FIG. 8 shows a learning fan rotor blade 130 having a pair of replaceable sections 66; e.g., a tip region selectively replaceable airfoil leading edge section 66A (see also FIG. 9) and a body region selectively replaceable airfoil leading edge section 66B (see also FIG. 10). As stated above, each selectively replaceable section 66 may be attached by any means that permits removal and replacement (e.g., by fasteners 69, etc.).

A learning fan rotor blade 130 may comprise a material the same (or substantially the same) as that used in an applicable reference fan rotor blade. Fan rotor blades can, however, be very costly. In some embodiments, a learning fan rotor blade 130—other than the selectively replaceable section(s) 66—may comprise a material (e.g., a less expensive material) different than the material used in the applicable reference fan rotor blade. In these embodiments, the selectively replaceable section(s) may comprise a material the same (or substantially the same) as the material used in the applicable reference fan rotor blade. By limiting the "reference rotor blade material" to the selectively replaceable section(s) 66, a cost savings may be realized, while still providing a realistic platform on which repair techniques can be practiced.

In some embodiments, the fan rotor blades 130 within the fan stage 48 may include a first subset of fan rotor blades 130 and a second subset of fan rotor blades 130. The first subset of fan rotor blades 130 includes a plurality of learning fan rotor blades as described above, and the second subset of fan rotor blades 130 that are substantial replicas of the applicable reference fan rotor blade. The second subset of fan rotor blades 130 may comprise a different material (e.g., less expensive) than that used in the applicable reference fan rotor blade.

In those embodiments that include a casing 56, the casing 56 may be configured to substantially replicate a casing of the model gas turbine engine for which the training apparatus 46 is configured. As stated above, the realism of the training is enhanced when the elements of the present training apparatus 46 are as similar as possible to the model gas turbine engine for which the training apparatus 46 is configured. In FIGS. 3-6, a training apparatus 46 is shown having a casing 56 that extends between two opposing fan stages 48A, 48B. In these embodiments, the fan stages 48A, 48B are substantial identical to one another (albeit independent of one another), and the casing 56 is therefore configured to substantially replicate the applicable model gas turbine engine. In some instances, peripheral devices 68 (or models thereof) that would be present on or in communication with the casing of the applicable model gas turbine engine may be included to increase the realism of the training apparatus 46.

In some embodiments, a casing 56 may be configured to provide internal access to the training apparatus 46. For example, in FIG. 6, the casing 56 includes an access port 70 that can be selectively opened to provide access to the fan rotor blades 130 of the fan stage 48. The access port 70 may be configured, for example, to allow an end-user to access the fan stage 48, and subsequently remove and replace a selectively replaceable section 66. As another example, the training apparatus 46 embodiment shown in FIG. 5 includes a split casing 56 having upper and lower segments (upper section is removed in FIG. 5), either of which may be removed to access components internal to the training apparatus 46.

In some embodiments, the training apparatus 46 may include a fan stage rotational resistance device 72 (e.g., see FIGS. 3 and 5) with one or more of the fan stages 48 within the training apparatus 46. In some embodiments, the fan stage rotational resistance device 72 is a device that is either not utilized within an operational gas turbine engine, or is a device present within an operational gas turbine engine that is designed for a purpose other than purposeful fan stage rotational resistance. A fan stage within an actual gas turbine engine is coupled to at least one engine shaft, which shaft may in turn be coupled to other components within the gas turbine engine. Hence, any attempt to rotate the fan stage of the actual engine will be resisted not only by the inertia of the fan stage, but also may be resisted by inertia associated with other components within the gas turbine engine that are coupled with or act upon the fan stage shaft. The fan stage rotational resistance device 72 provided in some embodiments of the present training apparatus 46 is configured to selectively replicate the amount of fan stage inertia that would present in the applicable actual engine. Here again, the training apparatus 46 is configured to selectively provide an element of realism to the technician receiving the training. In the embodiment shown in FIG. 5, the fan stage rotational resistance device 72 includes an adjustable tension binding strap 74 that acts on the fan stage 48 to frictionally impede rotation of the fan stage 48. The present disclosure is not limited to this particular fan stage rotational resistance device 72 embodiment.

Figure 3:
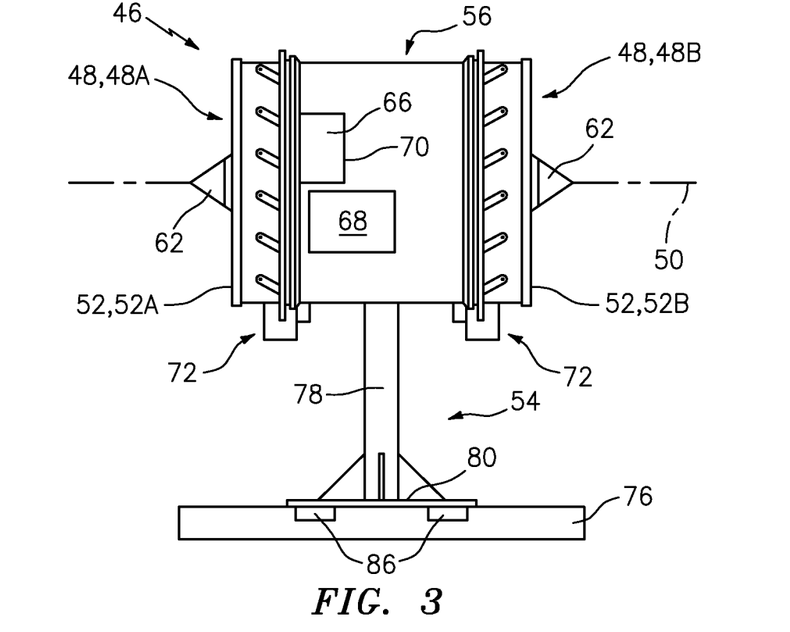
FIG. 3 is a diagrammatic side view of a training apparatus embodiment according to the present disclosure.
Figure 4:
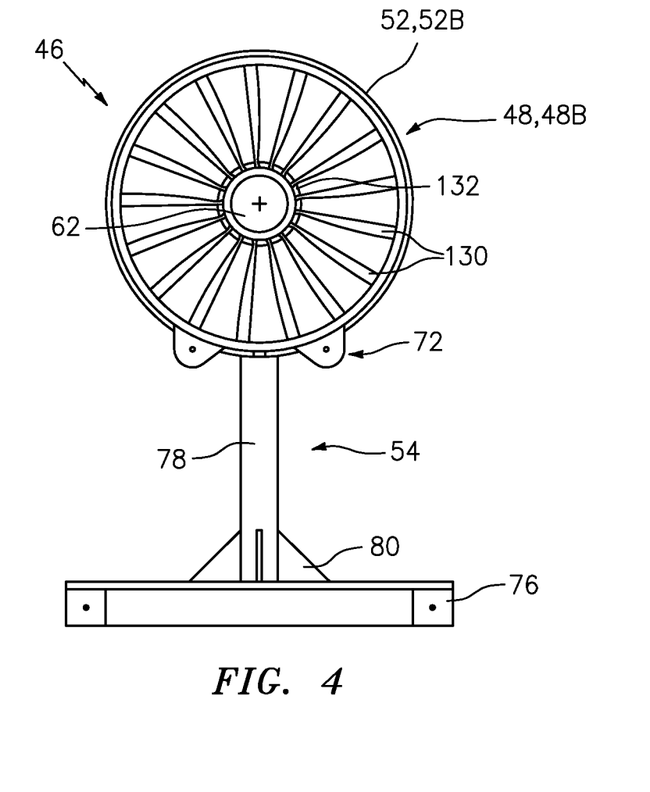
FIG. 4 is a diagrammatic end view of the training apparatus embodiment shown in FIG. 3.
Figure 5:
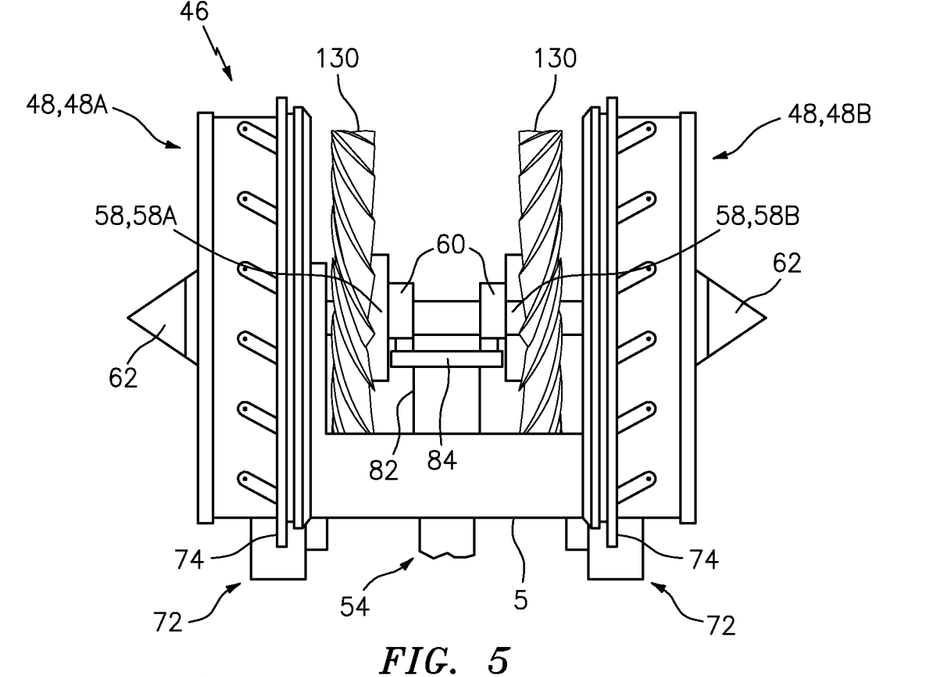
FIG. 5 is a diagrammatic perspective view of a training apparatus embodiment according to the present disclosure.
Figure 6:
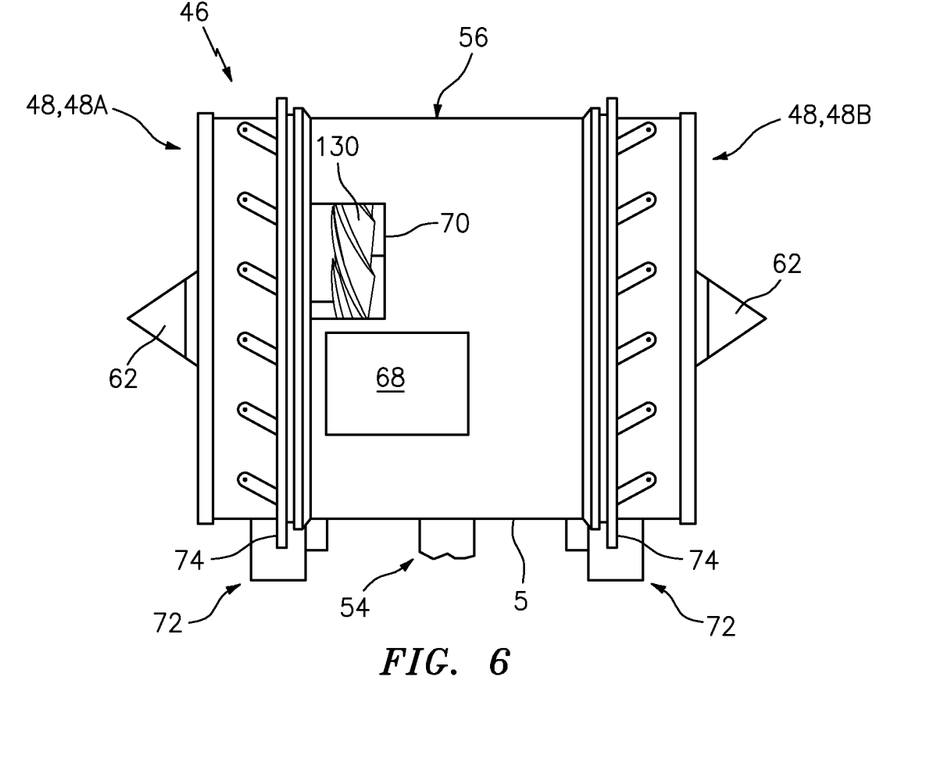
FIG. 6 is a diagrammatic perspective partial view of a training apparatus embodiment according to the present disclosure.

Referring to FIGS. 3 and 4, the stand 54 includes a base 76 and at least one post 78 having a base end 80 and a distal end 82 (see FIG. 5). The base end 80 is connected to the base 76 and the distal end 82 is in communication with the at least one fan stage 48. In the embodiment shown in FIG. 5, the distal end 82 of the post 78 includes a flange 84 to which the one or more bearing assemblies 60 supporting each fan stage shaft 58 are attached. The stand 54 is configured to support and provide stability for the training apparatus 46. The stand 54 may be configured to position the fan stage(s) 48 at a particular vertical height off of a horizontal surface (e.g., a shop floor). The magnitude of the vertical height may be chosen to replicate the vertical position the applicable actual gas turbine engine assumes when on wing. Here again, the training apparatus 46 is configured to selectively provide an element of realism to the technician receiving the training. The stand 54 may be configured to facilitate movement of the training apparatus 46; e.g., the stand may include apertures 86 (see FIG. 3) sized and spaced apart so the training apparatus 46 can be readily engaged with a fork truck for movement within an end-user's facility. The stand 54 shown in the FIGURES and described above is a non-limiting example of a stand configuration that may be included in the training apparatus 46. Alternative stands that are configured to position and support one or more fan stages may be used alternatively.

While various embodiments of the present disclosure have been disclosed, it will be apparent to those of ordinary skill in the art that many more embodiments and implementations are possible within the scope of the present disclosure. For example, the present disclosure as described herein includes several aspects and embodiments that include particular features. Although these features may be described individually, it is within the scope of the present disclosure that some or all of these features may be combined with any one of the aspects and remain within the scope of the present disclosure. Accordingly, the present disclosure is not to be restricted except in light of the attached claims and their equivalents.

What is claimed is:

1. A training apparatus, comprising:
   at least one gas turbine engine fan stage having a plurality of fan rotor blades attached to a disk, the at least one gas turbine engine fan stage having an axially extending centerline, and the disk mounted for rotation about the axially extending centerline; and
   a stand configured to support the at least one gas turbine engine fan stage;
   wherein the plurality of fan rotor blades includes at least one learning fan rotor blade having an airfoil, the airfoil has a geometric configuration with at least one preexisting geometric deviation, the at least one preexisting geometric deviation being deviant from a design geometric configuration of a reference fan rotor blade.

2. The training apparatus of claim 1, further comprising an inlet section in communication with the at least one gas turbine engine fan stage, disposed forward of the at least one gas turbine engine fan stage.

3. The training apparatus of claim 1, further comprising a casing that at least partially encloses the at least one gas turbine engine fan stage.

4. The training apparatus of claim 3, wherein the casing includes at least one access port.

5. The training apparatus of claim 3, wherein the casing is configured as a split casing having a first portion and a second portion.

6. The training apparatus of claim 1, further comprising a fan stage rotational resistance device, which device is configured to adjustably resist rotation of the at least one gas turbine engine fan stage.

7. The training apparatus of claim 1, wherein the at least one preexisting geometric deviation is disposed proximate a leading edge of the airfoil.

8. The training apparatus of claim 1, wherein the at least one learning fan rotor blade comprises a first material, and a remainder of the plurality of fan rotor blades comprise a second material, wherein the second material is different from the first material.

9. The training apparatus of claim 1, wherein the at least one learning fan rotor blade has at least one selectively replaceable section which includes the at least one preexisting geometric deviation.

10. The training apparatus of claim 9, wherein the at least one learning fan rotor blade airfoil is configured to receive the at least one selectively replaceable section, and the at least one selectively replaceable section is configured such that when the at least one selectively replaceable section is received on the airfoil, the airfoil substantially conforms to a design configuration of the reference fan rotor blade.

11. The training apparatus of claim 10, wherein the at least one selectively replaceable section is configured to form at least a portion of a leading edge of the at least one learning fan rotor blade airfoil.

12. The training apparatus of claim 11, wherein the at least one selectively replaceable section is attached to the airfoil by fasteners.

13. The training apparatus of claim 9, wherein the at least one learning fan rotor blade comprises a first material, and a remainder of the plurality of fan rotor blades comprise a second material, wherein the second material is different from the first material.

14. The training apparatus of claim 9, wherein the at least one learning fan rotor blade comprises a first material, and the at least one selectively replaceable section comprises a second material, wherein the second material is different from the first material.

15. A training apparatus, comprising:
   a first gas turbine engine fan stage having a plurality of first fan rotor blades attached to a first disk, the first gas turbine engine fan stage having a first axially extending centerline, and the first disk mounted for rotation about the first axially extending centerline; and
   a second gas turbine engine fan stage having a plurality of second fan rotor blades attached to a second disk, the second gas turbine engine fan stage having a second axially extending centerline, the second disk mounted for rotation about the second axially extending centerline;

wherein the first gas turbine engine fan stage is independent of the second gas turbine engine fan stage;

a stand configured to support the first gas turbine engine fan stage and the second gas turbine engine fan stage;

wherein the first gas turbine engine fan stage and the second gas turbine engine fan stage are oppositely positioned; and a casing that at least partially encloses the first gas turbine engine fan stage and the second gas turbine engine fan stage;

wherein at least one of the plurality of first fan rotor blades or the plurality of second fan rotor blades, includes at least one learning fan rotor blade having an airfoil, the airfoil has a geometric configuration with at least one preexisting geometric deviation, the at least one preexisting geometric deviation being deviant from a design geometric configuration of a reference fan rotor blade.

16. The training apparatus of claim 15, wherein the at least one learning fan has at least one selectively replaceable section which includes the at least one preexisting geometric deviation.

17. The training apparatus of claim 15, wherein the first gas turbine engine fan stage and the second gas turbine engine fan stage are rotationally independent of one another.

18. A training apparatus, comprising:
  at least one gas turbine engine fan stage having a plurality of fan rotor blades attached to a disk, the at least one gas turbine engine fan stage having an axially extending centerline, and the disk mounted for rotation about the axially extending centerline;
  a stand configured to support the at least one gas turbine engine fan stage; and
  a fan stage rotational resistance device, which device is configured to adjustably resist rotation of the at least one gas turbine engine fan stage.

* * * * *